United States Patent [19]

Rahav

[11] 4,248,317

[45] Feb. 3, 1981

[54] LOAD CELL APPARATUS

[75] Inventor: Amir Rahav, King of Prussia, Pa.

[73] Assignee: Cardinal Scale Manufacturing Company, Webb City, Mo.

[21] Appl. No.: 73,693

[22] Filed: Sep. 10, 1979

[51] Int. Cl.³ .................. G01G 19/02; G01G 3/14; G01G 21/24
[52] U.S. Cl. ................. 177/134; 177/211; 177/DIG. 9; 177/255
[58] Field of Search ............... 177/208, 211, DIG. 9, 177/134, 255; 73/141 A

[56] References Cited

U.S. PATENT DOCUMENTS

| | | | |
|---|---|---|---|
| 3,147,616 | 9/1964 | Rome | 177/208 X |
| 3,161,046 | 12/1964 | Farley | 73/141 A |
| 3,261,417 | 7/1966 | Golding | 177/208 |
| 3,621,927 | 11/1971 | Ormond | 73/141 A X |
| 3,633,695 | 1/1972 | Bradley | 177/208 |
| 3,935,913 | 2/1976 | Wagner et al. | 177/134 |

*Primary Examiner*—George H. Miller, Jr.

*Attorney, Agent, or Firm*—Schmidt, Johnson, Hovey & Williams

[57] ABSTRACT

Apparatus is provided for mounting a load cell unit between the fixed support and shiftable force responsive structures of a weighing scale or other force measuring equipment in an improved manner minimizing to a point of virtual elimination the accuracy impairing effects of "side loading" of the load cell unit due to lateral and rotational movements of the shiftable structure relative to the fixed structure caused by spurious factors. The load cell unit is disposed between, and in oppositely engaged type coupling relationship with, a rigid plate and a flexure plate spaced from the latter in a carrier assembly, and the carrier assembly is disposed between, and in oppositely engaged rolling contact type coupling relationship with, opposed portions of the fixed and shiftable structures. The engagement coupling relationship between the load cell unit and the flexure plate of the carrier assembly is also of the rolling contact type. The rolling contact couplings are each provided by engagement of a generally spherically curved, convex surface with an associated opposing surface, the latter preferably being substantially flat.

15 Claims, 7 Drawing Figures

LOAD CELL APPARATUS

BACKGROUND OF THE INVENTION

1. Field of the Invention

This invention relates to force measuring equipment, such as weighing scales, employing at least one load cell unit for sensing a force to be measured and acting as a mechanical-to-electrical transducer to provide an electrical output whose characteristics are correlated in predetermined fashion with the magnitude of the mechanical force being sensed by the unit.

More particularly, this invention is concerned with improving the accuracy of such force measurements by substantially eliminating or significantly minimizing the side loads typically transferred to the load cell unit along with the primary component of the force to be measured.

2. Specific Background Considerations

In order to understand the real nature of the problem addressed by this invention and the full significance of the manner in which it is solved by the invention, as well as the ultimate importance of certain differences between the integrated and successful approach utilized by the invention and the partially similar but incomplete and inadequate techniques employed in prior art devices now in common usage and heretofore accepted as representing the best available "compromises", it is necessary to recall certain basic aspects and to consider certain more detailed characteristics of large weighing scales (and similar force measuring equipment), load cell units of the "compression" type typically employed in such equipment, and flexure plates of the type sometimes utilized in conjunction with such units.

Typical large weighing scales have extensive and massive weighbridge structures, usually formed at least in part of steel structural components, receiving thereon the load to be weighed. Portions of the weighbridge structure are supported upon the upper ends of a number of "compressible" load cell units (or, as in this invention, assemblies incorporating such units), and the lower ends of such units (or assemblies) in turn rest upon fixed support structures typically mounted on the ground. The presence of a load to be weighed upon the weighbridge structure urges the latter downwardly with increased force upon the load cell units, which are thereby increasingly "compressed" and provide electrical outputs from which the weight of the load may be determined and indicated in known manner. Manifestly, it is only the vertically downwardly directed force component of the weight of the load which is relevant to the desired measurement.

However, the vertically downwardly directed force component of the load weight must be transferred to the load cell units via the weighbridge structure, which, although typically restrained against gross lateral or rotational movement relative to its support structure (by check rods or the like), is susceptible to the effects of spurious factors capable of causing secondary lateral and rotational movements of the portions thereof that transfer the primary vertical force component of the weight being measured to the load cell units. Such lateral and rotational movements of the weighbridge structure are inherent in any practical scale construction, and typically so to at least an extent such that, in the absence of effective efforts to negate their effects, the resulting "side loads" or lateral and rotational force components presented by the weighbridge structure to the load cell units (or assemblies incorporating the latter) are of significant levels sufficiently in excess of acceptable tolerances to adversely affect the accuracy of the desired weight measurement or, in extreme cases, even damage the load cell units.

The load cell units typically involve a base element resting upon the underlying support structure and an ideally vertically upwardly extending shiftable element upon which the weighbridge structure is resting, so that the axis of "force measuring compressibility" of the unit will be properly oriented for sensing of the primary vertically downwardly directed force component of the load carried by the weighbridge structure. Although the objectionable lateral and/or rotational movements of the weighbridge structure relative to the underlying fixed support structure involve linear or horizontal angular displacements, they also result in application of the force of load to be measured upon the load cell unit along a vector tilted away from its ideal vertical orientation. Accordingly, it is convenient and customary to make quantitative references to the side loads applied to a load cell unit in terms of the angle away from vertical of such force or load vector applied to the load cell unit caused by the side loads involved. In those terms, a typical load cell unit will begin to suffer serious deterioration of its force measuring accuracy whenever the tilt of such vector induced by side loads exceeds about 0.5 degrees from vertical.

It should be noted that such impairment of accuracy results mainly from the peculiar sensitivity of load cell units to even relatively small magnitudes of side load force components.

Among the spurious factors which commonly cause side loads are imperfections of structural alignment of parts of the scale or other force measuring equipment during fabrication or installation thereof, thermal expansion or contraction of structural parts when the temperature departs in either direction from that for which the juxtapositions of parts were adjusted during installation, and deflections of parts induced by the load being weighed or other force being measured. Initial imperfections of alignment of structural parts, such as a non-horizontal girder flange or an out-of-level support surface on the portion of the fixed base structure underlying a load cell unit, can produce "build-in" rotational tilts in the axes of the load cell units. In carefully constructed large scales, the tilting of the axes of the load cell units resulting from imperfection of initial structural misalignments can normally be held to somewhat less than 0.5 degree; however, errors in fabrication or installation can cause much larger "built-in" tilt angles of the axes of one or more load cell units of a particular large scale ranging up to 3.0 degrees or more, tilt angles from such cause commonly exceeding 0.5 degrees as a practical matter in too many instances. Since large scales are often located out of doors and subject to widely varying ambient temperatures, the side load tilting of the axes of the load cell units or the vector force applied thereto from ambient temperature changes may typically range up to as much as 1.0 degree. Side loading of the load cell units resulting from load induced deflection of structural parts typically may be of the order of 0.5 degree depending, of course, upon the over-all construction employed. Since such tilt angles of the axes of the load cell units or the force vector applied thereto from side load effects may act in various directions and may be additive under particular circumstances, it is apparent that such tilting to and beyond the point at which serious deterioration of the accuracy of measurement commences are common in practical situations and must be somehow avoided or the effects thereof negated if accuracy of measurement is to be preserved.

To that end, efforts have been made to employ flexure plates for the transmission of force from the weighbridge structure to the load cell units, such devices essentially comprising a steel plate having a pair of opposite marginal sections thereof rigidly mounted, with the intervening span of the plate being adapted to flex in the direction of its thickness in response to a force applied near the center of such span. Such flexure plates are helpful and effective in largely eliminating side loading due entirely to linear type horizontal shifting of the weighbridge structure, since the flexure plate can normally merely flex in the direction of its thickness but not move laterally thereto because of the rigid securement of its marginal sections and the inherent resistance of plates to distortion in response to force components acting along their major plane; however, unfortunately, a flexure plate becomes almost totally ineffective for eliminating side load effects when it is subjected to rotational as well as lateral side loading forces, which is frequently the case with the side load problem experienced with weighbridge structures and the like.

DESCRIPTION OF THE PRIOR ART

Three prior approaches to solving the problem of side load effects in weighing scales and the like are known to have been proposed and to have enjoyed varying degrees of commercial acceptance as providing at least a partial or compromise remedy for the problem, which may be adequately effective under certain conditions, although not in other situations which regularly occur as a practical matter.

The first of such prior attempts to solve the problem is illustrated in FIG. 3, wherein a weighbridge structure 10 has a downwardly facing force transmitting portion 12 provided with a generally spherically concave surface 14 engaged with a convex generally spherical surface 16 on the upper shiftable element 18 of a load cell unit 20 whose lower base element 22 is provided with a convex generally spherically curved surface 24 in engagement with a concave generally spherical surface 26 upon an upwardly facing portion 28 of a fixed underlying support structure 30. The technique represented by such construction is effective to reduce side loading upon the load cell unit 20 relative to the portion 28 of the fixed support structure 30, since the mating surfaces 14 and 16 and the mating surfaces 24 and 26 are of nature to permit relative movement between the structures 10 and 30 without imposing substantial side forces upon the elements 18 and 22 of the load cell unit 20. However, the arrangement of FIG. 3 is not alone effective to adequately eliminate the deleterious effects of side loading.

A second prior approach to attempting to deal with the problem is illustrated in FIG. 4, wherein parts analogous to those described in connection with FIG. 3 are identified by similar reference numerals, but wherein the base element 22 of the load cell unit 20 is directly engaged with a flat surface area 32 upon the top portion of the support structure 30 and the surface 16 of the upper shiftable element 18 of the load cell unit 20 is engaged with a downwardly facing surface 34 provided on a flexure plate member 36 rigidly secured along marginal sections thereof to upstanding side walls or other supports 38 and 40 of an assembly 42 also including a rigid base member 44 upon which the supports 38 and 40 are rigidly mounted, an upper zone of the flexure plate 38 being in engagement with and rigidly secured to what effectively constitutes a part of the weighbridge structure 10 presented by intervening plates 46 and 48 between which resilient shock absorbing pads may be provided as at 50. In the absence of rotational shifting of the weighbridge structure 10 relative to the fixed support structure 30, the device of FIG. 4 is relatively effective in eliminating side loading upon the load cell unit 20 due to linear type lateral force components exerted by tendencies of the weighbridge structure 10 to shift in a horizontal linear direction, and it will be perceived that the rigid connection effected between the flexure plate 36 and the weighbridge portion 12 by the plates 46, 48 and bolts 52 interconnecting the same actually permits the inherent nature of the flexure plate 36 to resist and diminish the linear lateral shifting of the weighbridge structure 10 which might otherwise occur. Unfortunately, however, the inherent nature of flexure plates 36 is such that, when they are subjected to a rotational force (or are bent out of their desired initially flat condition during fabrication or installation), they will bend out of their original shape and be rendered incapable of then preventing the transmission of accompanying lateral type side load force components which may concurrently be present. Since only relatively small rotational force components are required to thus render ineffective flexure plates of thicknesses permitting sufficient flexing action thereof to effectively transmit the primary vertical component of the force to be measured, such approach to the problem is inadequate whenever even modest rotational force components may be expected, as is the case in most practical scale installations.

A third approach to the problem, which is not specifically illustrated in the accompanying drawings, but which is shown and described in the Merriam et al U.S. Pat. No. 3,587,761, issued June 28, 1971, involves the interposition between the flexure plate 36 (as in FIG. 4) and the portion 12 of the weighbridge structure 10 of interfacing pads coated with a low-friction material such as Teflon. The theory of that approach is that the weighbridge structure 10 will thus be slideably supported upon the flexure plate 36 and that such sliding engagement type coupling will tend to decrease the side load forces reaching the flexure plate from the portion 12 of the weighbridge structure 10. In practice, however, this has not provided an adequate solution to the problem, particularly in scales or force measuring equipment in which large force loads must be handled, because of the tendency of the slideably interfaced pads to still transmit sufficient lateral forces to the flexure plate 36 to render the latter ineffective for reducing side loads upon the load cell units 20 to acceptable levels, particularly after the initially low friction pads have been subjected to wear, aging and the possible ingress of foreign materials therebetween.

Accordingly, although prior approaches to the problem of side load effects in scales and force measuring equipment have accomplished partial solutions that are effective or ineffective in varying degrees under various conditions encountered in practice, no full and universally applicable solution to the problem is known to have heretofore been proposed or used, either by the many skilled persons interested in the problem and working in the field or by others.

SUMMARY OF THE INVENTION

In a broad sense, this invention provides an overall solution to the side load problems so long endured with scale equipment employing "compressible" load cell units in supporting relationship to the weighbridge, through a novel integrated combination of components and relationships only individually utilized in differing incomplete combinations in prior devices of the same class. It is essentially based upon careful recognition of the individual capabilities and limitations inherent in particular components and relationships, as a foundation for providing improved load cell mounting apparatus requiring a minimum of individually conventional components interrelated in a novel arrangement for cooperatively achieving what is thought to be an unexpectedly simple, but equally effective and universal, solution to one of the most troublesome problems that has persistently plagued manufacturers of large weighing scales and similar equipment.

The improved apparatus of the invention utilizes a carrier assembly employing a flexure plate, which assembly is interposed between the shiftable weighbridge and the fixed support structure and in rotatable and rolling contact engagement with each of them, for shielding the flexure plate against rotational distortions that could otherwise render its resistance to lateral force components ineffective, as well as for initially reducing the lateral force components that would otherwise be applied to the flexure plate from the weighbridge, it being noted that the maximum side force transferable to the carrier assembly is limited to the minimal force of rolling friction. The improved apparatus then disposes the load cell unit within such carrier assembly, with the load cell unit interposed between the flexure plate and a fixed base of the assembly and in axially centered contact with the flexure plate, so that the only force transferred from the flexure plate is along the central axis of the load cell unit and free of side load components from the weighbridge. The apparatus thus effectively isolates the load cell unit, which is the mechanism most significantly sensitive to side loads, from both lateral and rotational force components generated at the weighbridge and which would seriously impair the accuracy of the force measurement if allowed to reach the load cell unit.

BRIEF DESCRIPTION OF THE DRAWINGS

In the drawings:

FIG. 5 is an enlarged, fragmentary view of the preferred embodiment of the apparatus of the invention, partly in elevation and partly in cross-section taken on irregular line 5—5 of FIG. 2;

FIG. 6 is an enlarged, top plan view of the carrier assembly of the apparatus of the invention, taken from line 6—6 of FIG. 2, with certain parts broken away and others shown in cross-section for clarity; and FIG. 7 is a further enlarged, fragmentary, cross-sectional view, showing details of the preferred mounting of the flexure plate in the carrier assembly of the apparatus of the invention, taken on line 7—7 of FIG. 6.

DESCRIPTION OF THE PREFERRED EMBODIMENT

It will be appreciated by those skilled in the art that the principles of the invention are also applicable to force measuring equipment for purposes other than weighing and to equipment in which the force to be measured is presented between relatively shiftable structures in other than a vertical direction and even to equipment in which both of the structures may be individually, rather than merely relatively, shiftable. However, for convenience of explanation, and because it does constitute a primary field of application for the invention, the invention is depicted and described herein with reference to an illustrative application of the invention to a typical, large weighing scale, such as commonly employed for weighing heavy vehicles.

Figure 1:
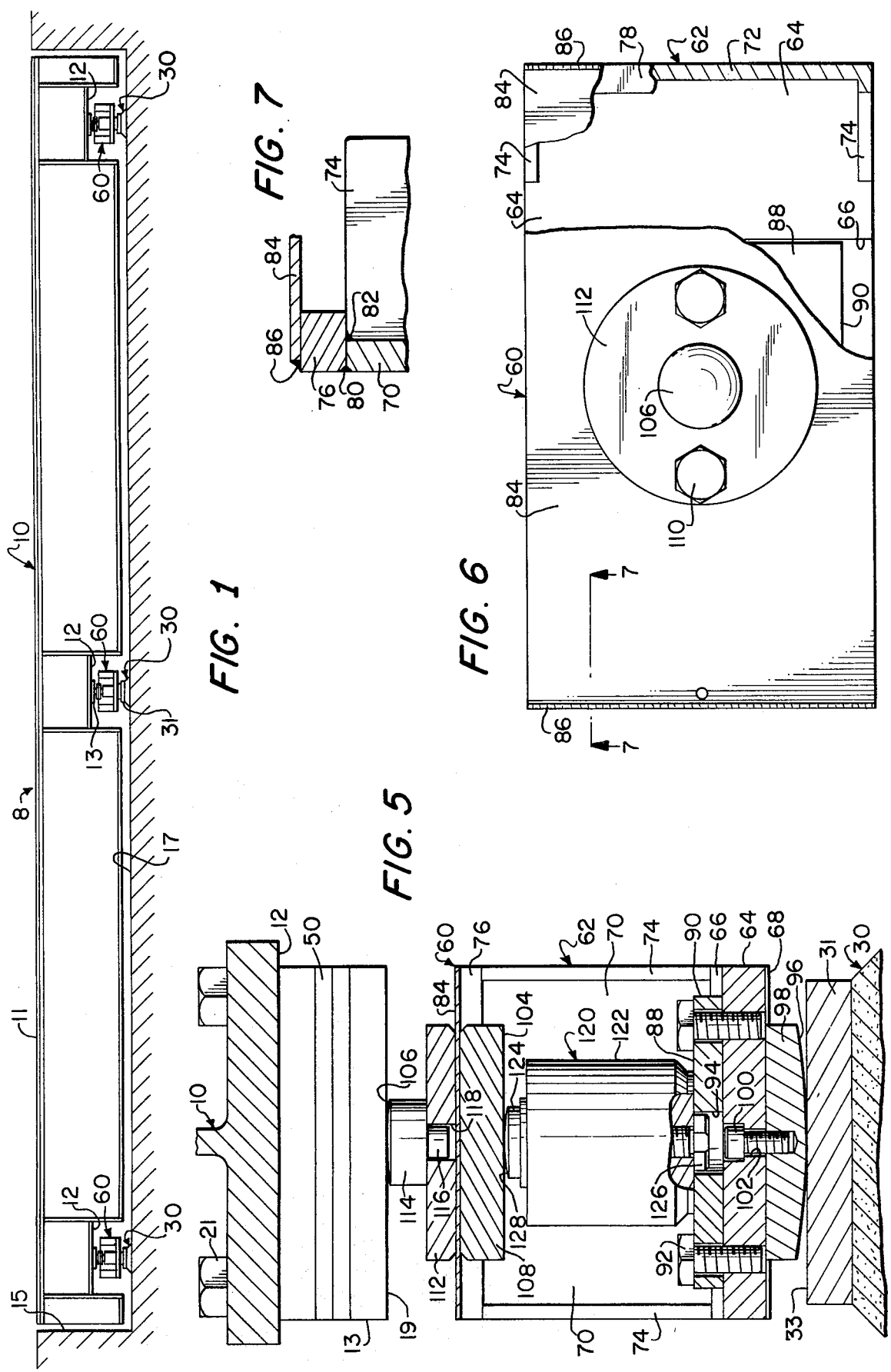
FIG. 1 is a somewhat schematic, side elevational view of certain primary components of a typical, large, weighing scale, into which the apparatus of the invention is incorporated.
Figures 2, 3, 4:
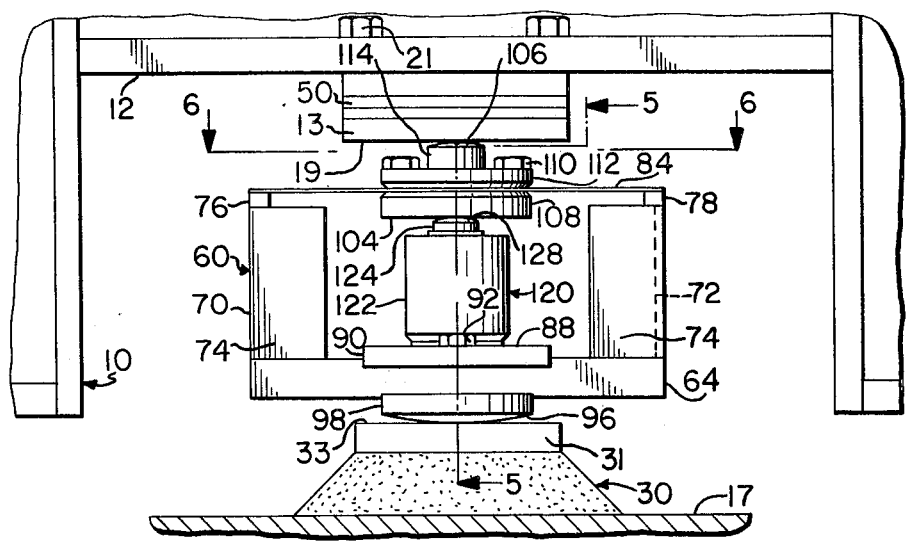
FIG. 2 is an enlarged, fragmentary, side elevational view of a portion of the weighbridge and support structures of the scale shown in FIG. 1, illustrating their relationship to a currently preferred embodiment of the apparatus of the invention.
FIGS. 3 and 4 are views similar to FIG. 2, but of representations of hypothetical devices illustrating prior art techniques previously discussed, which are somewhat "idealized" to depict various features in form similar to details of construction of the apparatus of the invention for facilitating comparison.

Referring first to FIG. 1, therefore, primary components of such a scale 8 are seen to include a shiftable weighbridge structure 10 (typically fabricated of materials including relative long and massive steel girders) having an upper, vehicular load receiving, top surface 11 and a number of recessed, downwardly facing, force transmitting portions 12, which usually include a top bearing plate assembly 13 secured thereto. The weighbridge structure 10 is frequently received within a pit 15 having a floor 17 provided with a fixed support structure 30, often including a bottom bearing plate portion 31, beneath each of the portions 12 of the weighbridge structure 10. The weighbridge structure 10 is shiftably supported upon the bottom support structures 30 by means of some form of vertically "compressible", force sensing and force measuring apparatus extending generally vertically upwardly from each support structure 30 to the corresponding portion 12 of the weighbridge structure 10 thereabove. Such apparatus, of the improved type provided by this invention, will be more particularly described hereinafter, but is generally indicated at 60 in FIG. 1.

Referring now to FIGS. 2, 5, 6 and 7, it may be first observed that, in the preferred construction for the scale 8, the bottom bearing plate portion 31 of each fixed support structure 30 is provided with a substantially flat and level, upwardly facing surface 33, and the top bearing plate assembly 13 of each portion 12 of the weighbridge structure 10 is provided with a substantially flat, downwardly facing surface 19, which should also be as level as fabrication and installation will permit. The assembly 13, which is secured to each portion 12 as by bolts 21, preferably includes sandwiched layers of shock-absorbing pad material as at 50 for cushioning the apparatus 60 during movement of a vehicle to or from the top surface 11 of the weighbridge structure 10.

The apparatus 60 includes a carrier assembly 62 having a rigid, lower, base plate 64 preferably recessed on its top as at 66 and on its bottom as at 68; a pair of upstanding, support walls 70 and 72 preferably provided with strengthening flanges 74 rigidly secured to the plate 64 in any suitable fashion such as welding; mounting bars 76 and 78 atop the walls 70 and 72 respectively secured to the latter as by welding as at 80 and 82; and a rectangular, steel flexure plate 84 atop and secured along marginal end sections thereof to the bars 76 and 78 by welding as at 86. A central area of the top of the base plate 64 is provided with an upwardly facing, substantially flat force bearing surface 88, which is preferably presented by a hardened steel plate section 90 rigidly secured to the remainder of the plate 64 within the recess 66 by bolts 92. The plate section 90 is provided with a center opening 94 therethrough for purposes hereinafter explained. A center zone of the bottom of the plate 64 is provided with a downwardly facing, generally spherically curved, force transmitting surface 96, which is preferably presented by a hardened steel plate extension 98 rigidly secured to the remainder of the plate 64 within the recess 68 by a center stud bolt 100 recessed into the plate 64 and passing through a center opening 102 in the latter that is axially aligned with the opening 94 through the center of the plate section 90. It will also be understood that the spherically curved surface 96 and the extension 98 presenting same will be centered upon the same axis. Similarly, a center area of the bottom of the flexure plate 84 is provided with a downwardly facing, substantially flat, force transmitting surface 104, and a center zone of the top of the flexure plate 84 is provided with an upwardly facing, generally spherically curved, force bearing surface 106. The downwardly facing surface 104 is preferably presented by a hardened steel plate section 108 rigidly secured to the bottom of the flexure plate 84 in centered relationship to the latter by means of bolts 110 that also pass through a plate section 112 oppositely secured to the top of the flexure plate 84 in centered relationship to the latter. The upwardly facing surface 106 is preferably presented by a hardened steel extension 114 carried by the plate section 112 by means of a bottom stud 116 on the extension fitted into a centered hole 118 in the plate section 112. The hole 118, extension 114 and spherical surface 106 are centered upon the same axis as the opening 94 of the plate section 90 and the spherical surface 96. The respective radii of curvature of the surfaces 96 and 106 are such that their sum is no less than and preferably at least somewhat greater than the distance between their most remote points or the equivalent distance between the surfaces 19 and 33 when the apparatus 60 is installed in the scale 8 and the latter is in normal condition without a load to be weighed on the surface 11 thereof. Because of the relatively limited angle through which the carrier assembly 62 may tilt during operation of the scale 8, as hereinafter further discussed, however, the radii of the surfaces 96 and 106 need not be made unnecessarily short, and should not be in order to minimize brinelling and wear.

The apparatus 60 is emplaced in the scale 8 in such manner that the spherical surface 96 is resting upon and in force transmitting engagement with a center portion of the flat surface 33 of the corresponding support structure 30, and a center portion of the flat surface 19 of the corresponding weighbridge portion 12 is resting upon and in weight transmitting engagement with the spherical surface 106 of the corresponding carrier assembly 62. Emplacement of the carrier assembly 62, is, of course, carried out during installation with the scale 8 in a no-load condition, so that the axis through the spherical surfaces 96 and 106 will be substantially vertical and substantially parallel to the flat surfaces 33 and 19, it being understood, of course, that the latter will also be substantially horizontal and parallel to each other. When so installed, the carrier assembly 62 is disposed for transferring the weight of the weighbridge structure 10 and any load upon the surface 11 of the latter to the center of the flexure plate 84 and in turn to the center of the surface 33 of the support structure 30 entirely in a downward direction along the substantially vertical, center axis through the spherical surfaces 106 and 96. By virtue of the spherical nature of the surfaces 96 and 106, and particularly the latter, any undesired rotation of the surface 19 due to rotational movement of the portion 12 of the weighbridge 10 caused by spurious factors is not transferred to the flexure plate 84 or the carrier assembly 62 to any significant extent, since the engagement between the surfaces 19 and 106 is of the relative rotation permitting contact type. When the surface 19 of the portion 12 of the weighbridge structure 10 is shifted in a lateral direction relative to the support structure 30 due to spurious factors, the carrier assembly 62 will be correspondingly tilted through a small angle displacing its central axis through the surfaces 96 and 106 away from the vertical, which tilting is permitted by the rolling contact type engagement of the spherical surfaces 106 and 96 with the surfaces 19 and 33 respectively. Such rolling contact type engagements and the tilting of the assembly 62 permitted thereby further serve to materially reduce the magnitude of the lateral force component applied to the flexure plate 84, because, as a matter of geometry, as the surfaces 106 and 96 roll upon the surfaces 19 and 33 in response to a given lateral movement of the surface 19 relative to surface 33, the actual horizontal displacement between the point of contact of the surface 106 with the surface 19 and the point of contact of the surface 96 with the surface 33 will become less than the horizontal distance that the surface 19 is being laterally shifted, thereby reducing the angle by which the axis of the assembly 62 will be tilted, and because, since the flexure plate 84 is spaced from the surface 19 and the lateral force component applied thereto will be proportional to the sine of the angle of tilt of the axis of the assembly 62, such lateral component force at the horizontal level of the flexure plate 84 will be reduced from that presented at or nearer to the surface 19. Whatever lateral force components may be applied to the flexure plate 84, in the absence of any accompanying rotational force component which could cause the flexure plate 84 to distort and lose its resistance to lateral forces simultaneously applied thereto, are, of course, resisted and absorbed by the flexure plate 84 by virtue of its known strength and ability to resist displacement in its own plane. Thus, the only force component having a significant effect upon the flexure plate 84 will be the primary component of the force to be measured acting along the axis of the assumedly tilted carrier assembly 62 and perpendicularly to the plane of the flexure plate 84. In response to that force component, the flexure plate 84 yieldably flexes in varying degrees dependent upon the magnitude of such force to move its lower surface 104 generally downwardly along and perpendicularly to the assumedly tilted axis of the carrier assembly 62.

The force measuring component employed in the apparatus 60 is a conventional load cell unit 120 having a lower base element 122 and an upper shiftable element 124. The shiftable element 124 is conventionally biased outwardly (or upwardly as the unit 120 is oriented in the preferred embodiment) away from the base element 122 along a center axis of both, but is adapted to be pushed back into the element 122 by a force to be measured applied in a "compressive" sense to the unit 120. The unit 120 will conventionally incorporate internal mechanisms for transducing the extent of inward movement of the shiftable element 124 relative to the base element 122 into an appropriate electrical output of characteristics correlated in known fashion with the "compressive" force applied to the unit 120, which electrical output may be carried from the unit 120 via flexible electrical leads (not shown) to conventional means for utilizing the same to provide a weight or force indication based upon the aggregate force sensings of the apparatus or apparatuses 60 employed in the particular scale 8 or other force measuring equipment involved. The bottom part of the base element 122 rests upon and is supported by the surface 88 of the plate section 90 and is maintained in axially centered relationship with the latter by a stud 126 threaded into the bottom of the base element 122 and fitted into the opening 94 in the plate section 90. The top part of the shiftable element 124 is preferably provided with a generally spherically curved, upwardly facing, convex surface 128, which is in rolling and relatively rotatable type contact engagement with the downwardly facing surface 104 of the plate 108 secured to the bottom of the flexure plate 84. The central axis of the elements 122 and 124 of the unit 120 is aligned with the central axis through the surfaces 96 and 106 of the carrier assembly 62 and substantially perpendicular to the plane of the surface 104 when the flexure plate 84 is in the normal condition thereof with no load applied to the scale 8. Thus, since any motion of the surface 104 is primarily along the central axis of the load cell unit 120, any objectionable side loading which would otherwise be applied to the element 124 of the unit 120 is virtually eliminated.

As previously noted, the load cell unit 120 will provide highly accurate measurements of a "compressive" force applied thereto, but, by virtue of its inherent characteristics, is vulnerable to any appreciable side loading and responds to the latter with a serious deterioration of measurement accuracy, even for side load forces which might seem of relatively minimal magnitude as compared with the primary force component being measured. Accordingly, it has been found that the integrated combination of components and relationships incorporated into the apparatus 60 for protecting the load cell unit 120 against side loading effects is what has been needed for solving that long-standing problem inherent in the manufacture, installation and use of scales and other equipment for measuring weights and forces of large magnitude.

Although the principles of the invention have been illustrated with reference to a currently preferred form of apparatus 60 incorporated into a typical scale 8 for weighing large trucks or the like, it should now be apparent to those skilled in the art that the principles of the invention are equally applicable to other forms of scales and to other forms of force measuring equipment, including those in which the apparatus 60 may be oriented with its axis in other than a generally vertical disposition to accommodate to force responsive structures displaced from each other in other than a vertical direction. It should be equally apparent that various minor modifications could be made from the details of construction of the preferred embodiment of the apparatus 60 shown and described for illustrative purposes, without departing from the real gist and essence of the invention. Accordingly, it should be understood that the invention should be deemed limited only by the fair scope of the subject matter defined by the claims which follow, and that such subject matter should be regarded as including all constructions constituting reasonable mechanical equivalents thereof.

I claim:

1. In a load weighing scale:

fixed support structure having an upwardly facing load bearing portion;

shiftable weighbridge structure having a downwardly facing load transmitting portion in generally vertically spaced, opposing relationship to said load transmitting portion of said support structure;

a shiftable carrier assembly disposed between said portions of said structures and including a lower, generally horizontal, rigid plate, an upper, generally horizontal, primarily generally vertically yieldable, flexure plate, and means secured to said rigid plate and connected with spaced, marginal sections of said flexure plate for holding said flexure plate in generally vertically spaced, opposing relationship with said rigid plate and above the latter, said rigid plate having an upwardly facing, load bearing area and a downwardly facing, load transmitting zone in generally vertically spaced, opposing relationship with said load bearing portion of said support structure and above the latter, said flexure plate having an upwardly facing, load bearing zone in generally vertically spaced, opposing relationship with said load transmitting portion of said weighbridge structure and below the latter, and a downwardly facing, load transmitting area in generally vertically spaced, opposing relationship with said load bearing area of said rigid plate and above the latter;

upwardly facing means on said load bearing zone of said flexure plate and above the latter for effecting a rolling contact and relatively rotatable engagement type coupling with a downwardly facing surface of said load transmitting portion of said weighbridge structure;

downwardly facing means on said load transmitting zone of said rigid plate and below the latter for effecting a rolling contact and relatively rotatable engagement type coupling with an upwardly facing surface of said load bearing portion of said support structure;

a force transducing, load cell unit disposed between said areas of said plates and including a lower, base element and an upper, primarily generally vertically shiftable, force responsive element, said force responsive element having a load bearing part in generally vertically spaced, opposing relationship with said load transmitting area of said flexure plate and below the latter, said base element having a load transmitting part in generally vertically opposing relationship with said load bearing area of said rigid plate and above the latter;

upwardly facing means on said load bearing part of said force responsive element and above the latter for effecting a rolling contact and relatively rotatable engagement type coupling with a downwardly facing surface of said load transmitting area of said flexure plate; and downwardly facing means on said load transmitting part of said base element for effecting an engagement type coupling with an upwardly facing surface of said load bearing area of said rigid plate.

2. A scale as set forth in claim 1, wherein:
each of said upwardly facing means on said load bearing zone of said flexure plate, said downwardly facing means on said load transmitting zone of said rigid plate, and said upwardly facing means on said load bearing part of said force responsive element includes a general spherically curved, convex surface in force transferring engagement with said surfaces of said load transmitting portion of said weighbridge structure, said load bearing portion of said support structure, and said load transmitting area of said flexure plate respectively.

3. A scale as set forth in claim 2, wherein:
each of said surfaces of said load transmitting portion of said weighbridge structure, said load bearing portion of said support structure, and said load transmitting area of said flexure plate is substantially flat.

4. A scale as set forth in claim 2, wherein:
the sum of the radius of curvature of said convex surface associated with said load bearing zone of said flexure plate and the radius of curvature of said convex surface associated with said load transmitting zone of said rigid plate being greater than the distance between the surface associated with said load transmitting portion of said weighbridge structure and the surface associated with said load bearing portion of said support structure.

5. In apparatus for measuring a force exerted between a pair of relatively shiftable structures in a direction for urging spaced, opposed, respective portions thereof into closer proximity to each other, wherein said portions of said structures are not only relatively movable closer to each other along a first axis parallel to said direction in desired response to said force to be measured, but are also susceptible to relative lateral movement with respect to said first axis and with lateral force components of significant levels in undesired response to effects of spurious factors such as alignment imperfections, thermal expansions or contractions, and force induced deflections in the apparatus:
 a force transducing, load cell unit including a pair of relatively shiftable, force sensing elements having spaced, oppositely extending, respective parts, which are not only relatively movable closer to each other along a second axis in desired response to applications thereto of a force directed along said second axis, but are also susceptible to relative lateral movement with respect to said second axis in undesired, accuracy of measurement impairing response to application thereto of laterally directed force components that are in excess of an acceptable level less than said significant level thereof;
 a load cell carrier assembly including a pair of relatively shiftable, force transmitting members having spaced, opposing, respective inner areas and spaced, oppositely facing, respective outer zones, which are not only relatively movable closer to each other along a third axis in desired response to application to said zones of a force directed along said third axis, but are also susceptible to relative lateral movement with respect to said third axis in undesired response to application to said zones of both laterally directed force components and force components tending to relatively rotate said zones with respect to an axis normal to said third axis that are in excess of acceptable levels less than said significant levels thereof, said members and said areas and zones thereof being effectively constrained against relative lateral movement thereof in greater than an acceptable amount in response to application to said zones of laterally directed force components of even said significant level thereof in the absence of application thereto of rotationally directed force components in excess of said acceptable level thereof;
said assembly being disposed between said portions of said structures with said third axis generally aligned with said first axis and said zones of said members disposed in spaced, opposing, respective relationship to said portion of said structures,
said unit being disposed between said areas of said members with said second axis substantially aligned with said third axis and said parts of said elements disposed in opposing respective relationship to said areas of said members;
means for effecting an interengaging operable coupling between said part of each of said elements and said area of the corresponding member in opposing relationship therewith; and
means for effecting a rotatably shiftable, interengaging operable coupling between said zone of each of said members and said portion of the corresponding structure in opposing relationship therewith,
whereby said laterally directed force components applied to said parts of said elements of said load cell unit are maintained within said acceptable level thereof even when lateral and rotation inducing force components of said significant levels thereof are presented between said portions of said structures.

6. Apparatus as set forth in claim 5, wherein:
said means for operably coupling said zone of each of said members with said portion of the corresponding of said structures includes a generally spherically curved, convex surface in force transferring engagement with a substantially flat surface for each zone and its corresponding portion.

7. Apparatus as set forth in claim 6, wherein:
each of said flat surfaces faces said zone of a corresponding member, and each of said convex surfaces faces said portion of a corresponding structure.

8. Apparatus as set forth in claim 6, wherein:
the sum of the radii of curvature of said convex surfaces associated with said members is greater than the distance between said flat surfaces associated with said structures.

9. Apparatus as set forth in any of claims 5 through 8 inclusive, wherein:
one of said structures is fixed, and the other structure is shiftable.

10. Apparatus as set forth in any of claims 5 through 8 inclusive, wherein:
one of said members is a flexure plate, the other member is rigid, and said assembly includes rigid mounting means secured to said flexure plate along spaced marginal sections thereof and oppositely secured to said other member.

11. Apparatus as set forth in claim 5, wherein:
said means for operably coupling said part of one of said elements with said area of the corresponding one of said members effects a rolling contact interengaging coupling.

12. Apparatus as set forth in claim 11, wherein:

said means for operably coupling said part of said one element with said area of said one member includes a generally spherically curved, convexly protruding surface in force bearing engagement with a substantially planar surface.

13. Apparatus as set forth in claim 12, wherein: said planar surface faces said part of said one element, and said convexly protruding surface faces said area of said one member.

14. Apparatus as set forth in any of claims 11 through 13 inclusive, wherein:

one of said structures is fixed, and the other structure is shiftable.

15. Apparatus as set forth in claim 14, wherein:

said one member is in opposing relationship with said other structure.

* * * * *